Patented June 15, 1926.

1,588,826

UNITED STATES PATENT OFFICE.

JAMES A. WADE, OF DETROIT, MICHIGAN.

REMEDY FOR SKIN BLEMISHES.

No Drawing.   Application filed May 10, 1923. Serial No. 638,095.

This invention relates to a cosmetic paste composition for use in the treatment of skin blemishes.

The object of the invention is to provide a face composition which when applied to the skin, will eradicate black heads and other skin blemishes.

The composition consists of a mixture of the following ingredients in about the proportions stated:

Lactic acid, 1 dram; boric acid, 1 dram; ceresine, 1 dram; paraffin oil, 6 drams; hydrous wool fat, 1½ ounces; castor oil, 6 drams; alum, ½ ounce.

The paste composition is prepared by mixing the paraffin oil and hydrous wool fat in a mortar or other vessel to which gentle heat is applied. At this time the ceresine is added to the mixture of paraffin oil and hydrous wool fat, and while the mixture is stirred, the castor oil is added. Finally the lactic and boric acids are added mixed with the alum.

The paste prepared as above will be found to be highly efficient in the treatment of the skin for the purpose of removing black heads and other blemishes of a similar character. It contains no harmful ingredients and in fact will be soothing to the skin.

Having thus described the invention, what is claimed as new is:

A cosmetic cream comprising a mixture of the following ingredients in about the proportions stated:—lactic acid 1 dram, boric acid 1 dram, ceresine 1 dram, paraffin oil 6 drams, hydrous wool fat 1½ ounces, castor oil 6 drams, and alum ½ ounce.

In testimony whereof I affix my signature.

JAMES A. WADE. [L. S.]